(12) United States Patent
Bhalerao

(10) Patent No.: US 12,406,011 B2
(45) Date of Patent: Sep. 2, 2025

(54) SYSTEM AND METHOD FOR RETRIEVING INFORMATION THROUGH TOPICAL ARRANGEMENTS

(71) Applicant: Mrunmayee Milind Bhalerao, Maharashtra (IN)

(72) Inventor: Mrunmayee Milind Bhalerao, Maharashtra (IN)

( * ) Notice: Subject to any disclaimer, the term of this patent is extended or adjusted under 35 U.S.C. 154(b) by 353 days.

(21) Appl. No.: 17/798,565

(22) PCT Filed: Feb. 8, 2021

(86) PCT No.: PCT/IN2021/000003
§ 371 (c)(1),
(2) Date: Aug. 10, 2022

(87) PCT Pub. No.: WO2021/161329
PCT Pub. Date: Aug. 19, 2021

(65) Prior Publication Data
US 2022/0391454 A1 Dec. 8, 2022

(30) Foreign Application Priority Data
Feb. 10, 2020 (IN) .............................. 202021005695

(51) Int. Cl.
*G06F 16/953* (2019.01)
(52) U.S. Cl.
CPC ................................. *G06F 16/953* (2019.01)
(58) Field of Classification Search
CPC ... G06F 16/953; G06F 16/9035; G06F 16/907
See application file for complete search history.

(56) References Cited

U.S. PATENT DOCUMENTS

| | | | |
|---|---|---|---|
| 6,556,983 B1 * | 4/2003 | Altschuler ............ | G06F 16/907 |
| | | | 707/E17.011 |
| 10,650,475 B2 * | 5/2020 | Berg ..................... | G06F 16/953 |
| 2003/0110158 A1 * | 6/2003 | Seals .................... | G06F 16/951 |
| | | | 707/999.001 |
| 2005/0278633 A1 * | 12/2005 | Kemp .................... | G06F 16/93 |
| | | | 707/E17.067 |
| 2016/0179807 A1 * | 6/2016 | Kumar ................ | G06F 16/3322 |
| | | | 707/706 |
| 2020/0226159 A1 * | 7/2020 | Wang .................... | G06F 16/951 |

* cited by examiner

*Primary Examiner* — Pierre M Vital
*Assistant Examiner* — Jedidiah P Ferrer
(74) *Attorney, Agent, or Firm* — Rivka Friedman

(57) ABSTRACT

A system and method for retrieving information through topical arrangements includes registering one or more users on a platform, receiving different types of nested topics and different types of information, creating different structures of the types of topics with nested levels, networking graphically these types of topics levels, arranging topics to retrieve information through these arrangements, receiving a query from one or more users or Internet of Things, creating an document list and full inverted index on these types of topics levels, extracting a plurality of tokens from the query, matching the plurality of tokens extracted from the query, mapping a plurality of matched topic levels with a higher-level set, retrieving these types of topics levels and information from a plurality of databases, segregating different types of topics and information, ranking sequence for a plurality of retrieved topics, displaying as per segregation of various topics in terms of category.

24 Claims, 7 Drawing Sheets

SYSTEM AND METHOD FOR RETRIEVING INFORMATION THROUGH TOPICAL ARRANGEMENTS

FIELD OF INVENTION

Embodiments of a present disclosure relate to information retrieval, and more particularly to a system and a method for retrieving information through topical arrangements.

BACKGROUND

Information retrieval is the science of searching for required information in a document, searching for documents themselves and also searching for the metadata that describes data, and for databases of texts, images or sounds. Search engine is a popular term for the information retrieval system. In a web search engine, the search engine matches a query against an index that the search engine creates. The web search engine presents required information in the form of links, images, videos and the like for a single query. However, the existing search engine provides a plurality of web documents for a single query which in turn creates a lot of difficulties for the user to find out the desired information from the plurality of documents. Also, it is a time-consuming process for searching the daily required information using the existing search engine. Moreover, the user is unaware of the hidden information which may not be visible to the user till the user requests a query for the hidden topic.

Further, various advanced search engines have been introduced to overcome the aforementioned issues. At present, the search engine which is available for searching the information, retrieves the search result based on a user query. Further, the search engine applies the criterion on a retrieved search result to present the search result in clusters, where each cluster represents a category based on applied criterion. However, the search engine limits search output only to the category structures.

Moreover, the search engine is unable to display all the hidden information which is associated with the user query available in the database for the user requirement. Also, most of the users of online search engines are still unaware of the latest news associated with the searched topic. Also, the existing search engine provides query linking in a chain pattern to see the next required query results. Moreover, for retrieving information associated with a particular topic, the user needs to input a query. However, if the user is new to the topic, the user faces difficulty to input queries associated with the new topic resulting in wasting a lot of time in searching daily required information.

Further, if a first user or a first thing in the internet of things has some information associated with a second user query, then such information remains confined to the first user or to the first thing in internet of things (IoT) due to lack of linkage between them. Moreover, the existing search engine searches on huge information which increases the backend processing power.

Hence, there is a need for an improved system and method for retrieving information through topical arrangements in order to address the aforementioned issues.

BRIEF DESCRIPTION

In accordance with an embodiment of the disclosure, a method for retrieving information through topical arrangements is disclosed. The method includes registering one or more users on a platform upon receiving a plurality of user details from the one or more users to keep track of actions performed and allow users to save information of his interest. The method also includes receiving different types of nested topics and different types of information through a web document with one or more means. The method also includes creating different structures of the types of topics with nested levels along with components. The method also includes customization of these topic structures in terms of designer components, shape, colour & borders based on user requirement. The structure creation subsystem is also configured to provide every topic on menu bar with different nested types of topics levels under single or multiple nested A-Z indices along with any type of advertisement based on user requirement, separate A-Z country index along with any type of advertisement per country, separate 0-9 index, scroll bars and combined posting bar based on user requirement. The method also includes networking graphically these types of topic levels based on user requirement. The method also includes arranging topics as fixed, variable, customized on menu bar and topic search bar to retrieve information through these arrangements. The method also includes receiving a query from one or more users or Internet of Things, wherein the query can be passed from one topic level to another, consisting of both static & dynamic parts and query can be created by applying artificial intelligence on database and behaviour. The method also includes creating a vocabulary list and a full inverted index on these types of topic levels, wherein these types of topics comprise social media, Internet of Things, fan, celebrity, audio, video etc., and levels comprise domain, sub domain; subject, page, category, subcategory and last level information. The method also includes extracting a plurality of tokens from the query. The method also includes matching the plurality of tokens extracted from the query with these types of topic levels indices along with a complete set of documents of a database. The method also includes mapping a plurality of matched topic levels to higher-level topics (from lower level to higher levels of topics till basic topic unit) till the basic unit of nested topic level such as a category for topic search. The method also includes retrieving these types of topic levels and information associated with the query from a plurality of databases based on matched and mapped topic levels and, providing information separately for the topic search bar. The method also includes segregating matched different types of topics and information required by one or more users or the Internet of Things. The method also includes ranking a sequence for a plurality of retrieved topics or last level information types as per search engine optimization formulated with various feedbacks such as count, dislike count, and numbers of postings made on our own or other social media from one or more users. The method also includes displaying according to the segregation of various topics in terms of category or any other topic level set as a basic unit, and providing information separately for topic search along with advertisements on a platform. The method also includes a second search engine in every topic category, which has features to select different sets of documents to be searched as documents under a single category topic, or documents under all nested category topics along with the selected topic, or documents under single topic along with any other topics documents. The method also includes generating leads country wise for the information owner for at least one topic level.

In accordance with another embodiment, a system for retrieving information through topical arrangements is disclosed. The system includes one or more user computing devices, one or more databases, and one or more processors, memory, and other relevant hardware. Various subsystems are stored in the memory such as a structure creation subsystem, a registration subsystem, a input receiving subsystem, a movable subsystem, a feedback subsystem a data storage subsystem, an information retrieval, subsystem and a display subsystem, which are executed by one or more processors for performing specific tasks. The system includes one or more processors. The registration subsystem operable by one or more processors is configured to register one or more users on a platform upon receiving a plurality of user details said users to keep track of actions performed and allow the users to save information. The structure creation subsystem operable by one or more processors is configured to receive different types of nested topics and different types of information through a web document with one or more databases. The structure creation subsystem is also configured to create different structures of the types of topics with nested levels. The method also includes customization of these topic structures in terms of designer components, shape, colour & borders as per-based on user requirements. The structure creation subsystem is also configured to graphically network the types of topic levels based on user requirements. The structure creation subsystem is also configured to arrange topics as fixed, variable, and customized on a menu bar and topic search bar to retrieve information through these arrangements. The structure creation subsystem is also configured to provide every topic on the menu bar with different nested types of topics levels under single or multiple nested A-Z indices along with any type of advertisement based on user requirement, separate A-Z country index along with any type of advertisement per country, separate 0-9 index, scroll bars and combined posting bar based on user requirement. The input receiving subsystem operable by one or more processors is configured to receive a query from one or more users or Internet of Things, wherein the query can be passed from one topic level to another, consisting of both static & dynamic parts, the query can be created by applying artificial intelligence on database and behaviour. The information retrieval subsystem operable by one or more processors is operatively coupled to the input receiving subsystem and is configured to create a vocabulary list and a full inverted index on the types of topic levels, wherein said types of topics comprise social media, Internet of Things, fan, celebrity, audio, video etc., and topics level comprises domain, sub domain, subject, page, category, subcategory and last level information. The information retrieval subsystem is also configured to extract a plurality of tokens from the query. The information retrieval subsystem is also configured to match the plurality of tokens extracted from the query with these types of topics levels indices along with a complete set of documents of a database. The information retrieval subsystem is also configured to map a plurality of matched topic levels to higher-level topics (from lower level to higher levels of topics till basic topic unit) till the basic unit of nested topic level such as a category for topic search. The information retrieval subsystem is also configured to retrieve the these types of topic levels and information associated with the query from a plurality of databases based on matched and mapped topic levels and, providing information separately for the topic search bar. The information retrieval subsystem is also configured to segregate different types of topics and information required by one or more users or the Internet of Things, wherein any type of information representation arrangement format for display comprises a fixed pattern, a new pattern, a saved list, a customized pattern and an indexed pattern parts. The information retrieval subsystem is also configured to rank a sequence for a plurality of retrieved topics or last level information types as per search engine optimization formulated with various feedbacks such as count, dislike count, numbers of postings made on our own or other social media from the one or more users. The system also includes a second search bar which has features to select different sets of documents to be searched as documents under a single category topic, or documents under all nested category topics along with selected topic, or documents under the single topic with any other topics documents. The system also includes a display subsystem operable by one or more processors and is operatively coupled to the information retrieval. The display subsystem is configured to display according to the segregation of various topics in terms of category or any other topic level set as a basic unit, and providing information separately for topic search along with advertisements on a platform. The method also includes generating leads country wise to information owner for atleast one topic.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures. Terminologies used for topics levels can be any other hierarchical terms. One of the level represents readymade queries here we assume it as subcategory.

BRIEF DESCRIPTION OF THE DRAWINGS

The disclosure will be described and explained with additional specificity and detail with the accompanying figures in which.

Figure 1:
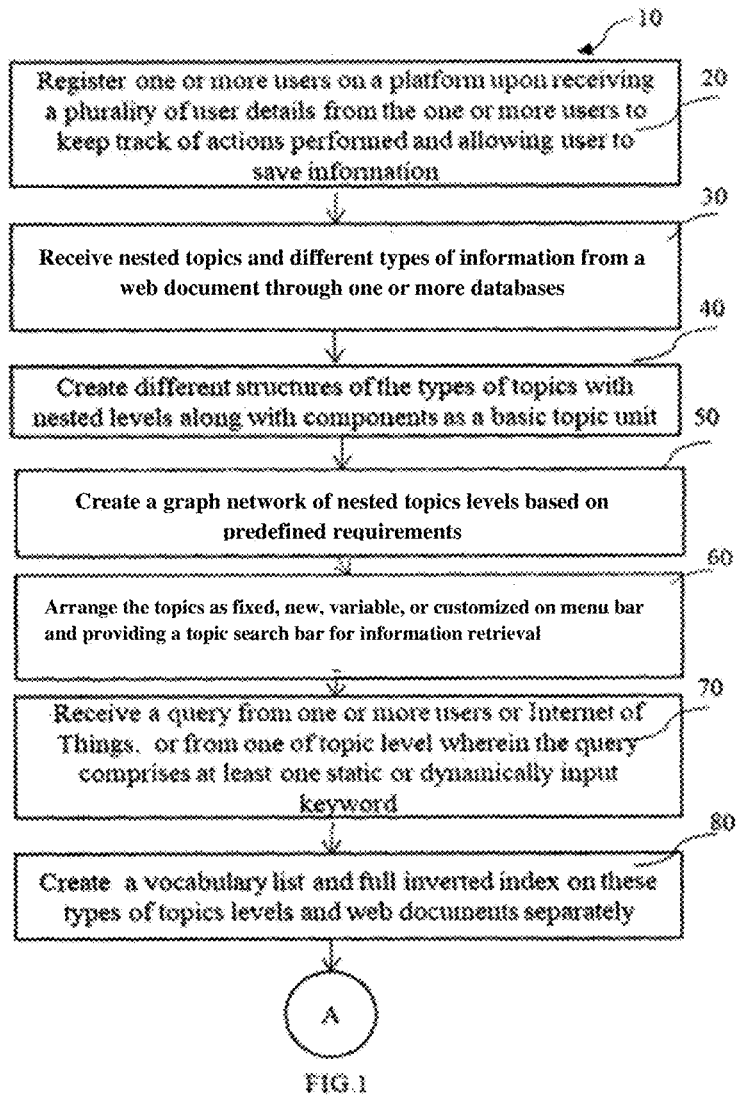
FIG. 1, FIG. 2 and FIG. 3 are flow diagrams representing steps involved in a method for retrieving information through topical arrangements in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method for retrieving information through topical arrangements. The system includes one or more processors. The system also includes a registration subsystem operable by one or more processors and is configured to register one or more users on a platform upon receiving a plurality of user details from one or more users to keep track of actions performed and allow said users to save information. The system also includes a structure creation subsystem operable by one or more processors and is configured to receive different types of nested topics and different types of information through a web document with one or more databases. The structure creation subsystem is also configured to create different structures of the types of topics with nested levels along with components as a basic topic unit. The method also includes customization of these topic structures in terms of designer components, shape, colour & borders based on user requirements. The structure creation subsystem is also configured to graphically network the types of topic levels based on user requirements. The structure creation subsystem is also configured to arrange topics as fixed, variable, and customized on a menu bar and first topic search bar to retrieve information through these arrangements. The structure creation subsystem is also configured to provide every topic topics on the menu bar with different nested types of topics levels under single or multiple nested A-Z indices along with any type of advertisement based on user requirement, separate A-Z country index along with any type of advertisement per country, separate 0-9 index, scroll bars and combined posting bar based on user requirement. The system also includes an input receiving subsystem operable by one or more processors and is configured to receive a query from one or more users or Internet of Things, wherein the query can be passed from one topic level to another, consisting of both static & dynamic parts, the query can be created by applying artificial intelligence on database and behaviour. The system also includes an information retrieval subsystem operable by one or more processors and is operatively coupled to the input receiving subsystem. The information retrieval subsystem is configured to create an inverted index on these types of topic levels, wherein the types of topics comprises social media, Internet of Things, fan, celebrity, audio, video etc., and types of topics level comprises domain, sub domain, subject, page, category, subcategory and last level information. The information retrieval subsystem is also configured to extract a plurality of tokens from the query. The information retrieval subsystem is also configured to match the plurality of tokens extracted from the query with these types of topics levels indices along with a complete set of documents of a database. The information retrieval subsystem is also configured to map a plurality of matched topic levels to higher-level topics set as the basic unit of nested topic level such as a category for topic search. The information retrieval subsystem is also configured to retrieve the types of topic levels and information associated with the query from a plurality of databases based on matched topic levels and information for the first topic search bar. The information retrieval subsystem is also configured to segregate different types of topics and information required by one or more users or the Internet of Things, wherein any types of information representation arrangement format for display comprises a fixed pattern, a new pattern, a saved list, a customized pattern and an indexed pattern parts. The information retrieval subsystem is also configured to rank a sequence for a plurality of retrieved topics or last level information types as per search engine optimization formulated with various feedback such as count, dislike count, numbers of postings made on our own or other social media from one or more users. The system also includes a display subsystem operable by one or more processors and is operatively coupled to the information retrieval subsystem. The display subsystem is configured to display, according to the segregation of various topics in terms of category or any other topic level set as a basic unit and, providing information separately for the first topic search along with advertisements on a platform. The system also includes a second search bar which has features to select different sets of documents to be searched as documents under a single category topic, or documents under all nested category topics along with selected topic, or documents under a single topic along with any other topics documents. The method also includes generating leads country wise to the information owner for atleast one topic.

Figure 2:
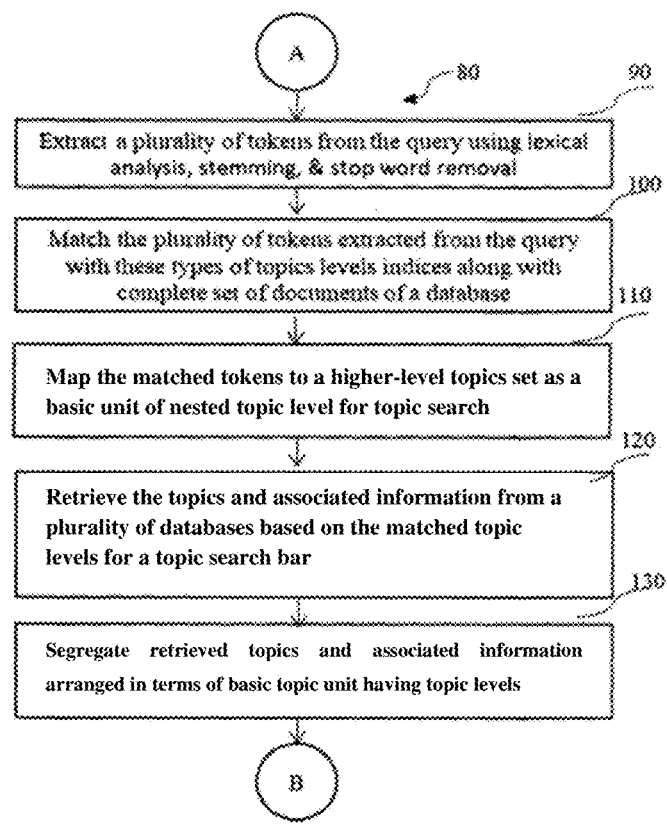
Figure 3:
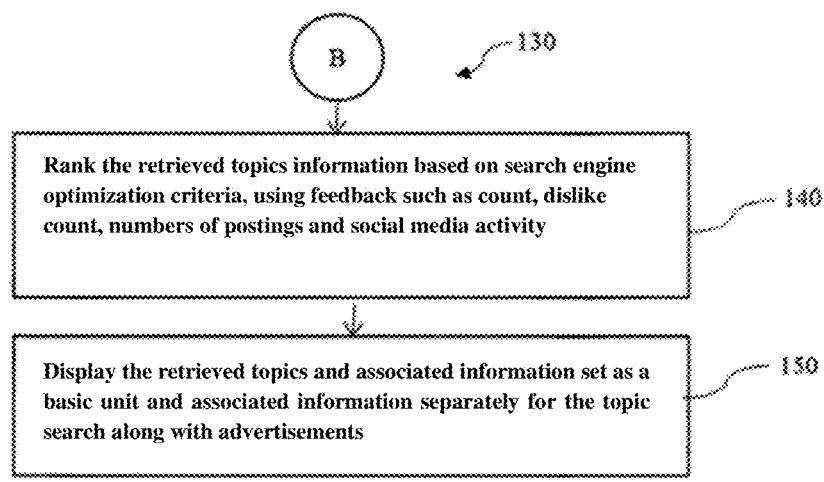

FIG. 1, FIG. 2 and FIG. 3 are flow diagrams representing steps involved in a method (10) for retrieving information through topical arrangements in accordance with an embodiment of the present disclosure. In one embodiment, the method (10) may include receiving, by a data storage subsystem, a plurality of details as an input associated with a plurality of nested topic levels, user & information owner personal information and further store the plurality of details in a corresponding table in a database. In such embodiment, the pluralities of nested topic levels include a domain, a sub domain, a subject, a page, a category, a subcategory and last level information.

In some embodiment, the method (10) may include storing, by the data storage subsystem, last level information in a different format as web uniform resource locator, address, information associated with internet of physical or virtual things, audio, video, user activity groups, products sale-, experts, ppts, IPR sale, products resale, maps, images, books, question and answers, services, events, jobs, share and save, wherein the user activity groups may include a groups associated with a plurality of users interested or working in the same topic domain, and groups associated with the internet of physical or virtual things or combination of both. Wherein at least one information head provides information country wise and the like in the database. In one embodiment, the method (10) may include creating the plurality of nested topic levels using a plurality of components.

The method (10) includes enabling, by a registration subsystem, one or more users to register on a platform upon receiving a plurality of user details from the one or more users to keep track of actions performed and allowing user to save information in step 20. In one embodiment, enabling the one or more users to register on the platform may include enabling the one or more users to register on the platform through a user computing device. In such embodiment, enabling the one or more users to register on the platform through the user computing device may include enabling the one or more users to register on the platform through one of a mobile phone, a laptop, a tablet, a desktop and the like.

The method (10) includes receiving, by a structure creation subsystem, different types of nested topics or other topics and different types of information through a web document with one or more databases in step 30. In one embodiment, the method (10) may include receiving different types of nested topics from user or by applying artificial intelligence to the database.

The method (10) also includes creating, by the structure creation subsystem, different structures of the types of topics with nested levels along with components in step 40. Topic levels are displayed in terms of a basic topic level unit set as a category, as a collection of subcategories. Subcategories are nothing but readymade queries. In one embodiment, creating different topic structures are based on application types of the topics such as social media, shopping, Internet of Things, business page, audio, video, celebrity, normal and alike, along with various components per topic as movement components, feedback from user components, help component, modifying component, topic title component, news component, different types of advertisements, second search bar, second search topic scope select component, user activity groups as per topic, audio, video, blog, topic related services, graphics components, dynamic news feed, display news feed bar based on a user location etc. and separate posting and display bar. Every topic category or basic unit will have common components such as share, like, and messages wherein the like feature describes the number of users who liked or unlike the retrieved nested topic levels. The share feature allows sharing selected media information with any of the friends on social media. The topics may be represented by separate posting and display bar instead of nested levels with the above components.

The method (10) also includes social media type of topic, wherein topic titles may be user relatives, friends, official and other as per requirement. Subcategories are nothing but user groups in this case. Relatives may include groups associated with plurality of relatives, friends may include groups associated with the plurality of the friends, and official may include groups associated with the officials. Subcategories or groups of relatives can be father side relatives, mother side relatives, father in laws relatives, mother in laws relatives and alike. In the same way every subcategory or group will have their user groups. In this social media topic structure, when clicked on group we see individual users under that group which are networked with each other by structure creation subsystem.

The method (10) also includes networking, by the structure creation subsystem, graphically any types of topic levels based on user requirement in step 50; The method (10) also includes arranging, by the structure creation subsystem, topics as fixed, variable, or customized and providing them to the first topic search bar for information retrieval in step 60.

In one specific embodiment, the method (10) may include a fixed topics arrangements where at least one topic is displayed A-Z country wise and with every possible means, variable topic arrangements wherein the plurality of variable topics are represented is in front of the one or more users in a cyclic manner from start to end of a database after a certain interval of time, new topic arrangements wherein the plurality of new topics are the daily submitted topics represented in front of the one or more users, first topic search bar wherein user can search topics or information in a database along with customization on fixed topic arrangement provision to edit or modify these topics content by the user or Internet of Things. Menu bar has fixed, variable, new, and customized topics arranged on it.

The method (10) also includes providing at least one topic A-Z country index wise for fixed, variable, new and customized arrangement, which means information under any type of topic is displayed A-Z country index wise.

The method (10) also includes one of the nested levels where set of readymade queries for every topic are expected with different means. Every query has two parts. One part as fixed query text and second part for new input of text as dynamic query part. E.g. query is–best movie of the year+ new input. Best movie of the year is static & new input is dynamic. Here user need not type static part again & again. This topic level can be from any topic on a system. This query structure may be used by any search engine.

The method (10) includes receiving, by an input receiving subsystem, a query from one or more users or Internet of Things, wherein the query may include at least one static or dynamically-input keyword in step 70. In one embodiment, receiving at least one query may include a selection of gathered text from the web document where a search bar is present or gathering of text as queries as per topic using artificial intelligence applied on web documents or selection of any of the topic level as a static part along with addition of dynamically-input keyword if required by one or more user or Internet of Thing in a search bar. This query structure may be used by any search engine.

In some embodiment, the method (10) may include enabling, by a customization subsystem, one or more registered users to edit, add or remove at least one nested topic level from the menu bar upon logging on the platform. Any action taken is applicable for individual login only. In one embodiment, the plurality of topics edited or modified by the one or more users is a representation of a plurality of customizable topics. An embodiment may include customization of topics by editing adding or removing categories from menu bar. Category structures and components wherein designer components structures with different shapes, borders, colours, and patterns can be made available as per customer requirement.

Further, the method (10) may include storing, by a data storage subsystem, a plurality of added nested topic levels in the plurality of databases for future use. Further, the method (10) includes creating, by an information retrieval subsystem, a vocabulary list and then full inverted index from these types of topics levels titles, wherein these types of topics level may include domain, sub domain, subject, page, category, subcategory and last level information in step 80.

In one embodiment, creating the vocabulary list may include lexical analysis, stemming, & stop word removal from topic titles, and web documents. Full inverted index creation from the plurality of nested topic levels may include table creation of terms and respective document, term frequency in document, & document frequency. The vocabulary list and full inverted index may be created for plurality of nested topics levels or for plurality of web documents in the database.

Furthermore, the method (10) includes extracting, by the information retrieval subsystem, a plurality of tokens by applying lexical analysis, stemming & stop word removal from the query in step 90.

In one embodiment (10), matching the plurality of tokens extracted from the query with a plurality of nested topic level indices, documents separately. Further mapping is done for matching terms of subcategory to basic unit level of topic i.e. category here. Here matching level title is mapped along with all respective hierarchical higher topic levels till predefined basic unit of topic level and are selected for further steps i.e. Category title along with matching subcategory title will be selected for further processing steps here.

Further, the method (10) includes retrieving, by the information retrieval subsystem, matching topics levels and information associated with the query from a plurality of databases based on a matched& mapped topic levels, and web documents separately for first topic search bar in step 110. Matched topic further can have nested subtopics to any level.

The method (10) also includes segregating, by the information retrieval subsystem, different types of topics and information required by the one or more users or the Internet of Things, wherein any types of information segregation comprises a fixed pattern, a new pattern, a saved list, a customized pattern and an indexed pattern parts in step 130. Wherein the plurality of retrieved nested topic levels may be segregated in terms of categories, in terms of timeline bars for city, country and international postings, scroll bars of topics, pull down menus, nested A-Z, 0-9 number of indices for topics, A-Z country index with topics along with different types of advertisements.

In one embodiment, selecting the at least one sub-category from the plurality of retrieved nested topic levels may include searching with subcategory or a query, information associated with the heads such as web uniform resource locator, address, information associated with internet of physical or virtual things, audio, video, user activity groups, products sale, experts, ppts, IPR sale, products resale, maps, images, books, question and answers, services, events, jobs, share and save, wherein the user activity groups may include a groups associated with a plurality of users interested or working in the same topic domain, and groups associated with the internet of physical or virtual things or combination of both. Wherein at least one information head provides information country wise. Further for at least one information owner or service provider under above service heads leads are generated.

The method (10) also includes ranking, by the information retrieval subsystem, a sequence for a plurality of retrieved topics or last level information type as per search engine optimization formulated with various feedback such as count, dislike count, numbers of postings made on our own or other social media from the one or more users in step 140.

The method (10) also includes displaying, based on segregation of various topics in terms of category or any other topic level set as a basic unit and information separately for the first topic search along with advertisements on a platform step 150.

In one specific embodiment, the method (10) may include, second search engine on every category, to search web documents or last level information for an input query to get more accurate information where scope of selected topics or documents to search can be changed; Second search engine follows steps 70 to 150 applicable to information; wherein variable topic scope allows to search under respective category as a default scope, or nested all categories, or any non nested topic category along with selected ones for searching. Wherein as per segregation of information and display system only information is displayed.

The method (10) may also include providing, by a structure creation subsystem, movement actions to the one or more users to move from a first nested topic level s to a second nested topic level by the use of level movement buttons (level 1, level 2, level 3 . . . ), next button and previous buttons to move on a same level, shared buttons, star button and the like.

Furthermore, in one embodiment, the method (10) may include displaying, by the display subsystem, news feed and a plurality of advertisements associated with the at least one nested topic levels based on a user location for a predefined amount of time. In such embodiment, displaying the news feed associated with the at least one retrieved nested topic level based on the user location for the predefined amount of time may include displaying the news feed associated with the at least one retrieved nested topic level based a user city and a user country.

In some embodiment, the method (10) may include enabling, by the display subsystem, the one or more users and one or more entities associated with the internet of things (IoT) to provide news feed associated with the at least one retrieved nested topic level in the plurality of databases. In such embodiment, enabling the one or more entities to provide news feed may include enabling a plurality of physical or virtual things in IoT to provide news feed.

The method (10) may also include displaying, by the display subsystem, country wise news feed associated with the at least one retrieved nested topic level to display postings on display bar country wise. In one embodiment, the method (10) may also include creating, by an information sharing subsystem, dynamic linkage between the one or more users, one or more entities associated with Internet of Things and a combination thereof for sharing the information associated with the at least one nested topic levels of topic in user activity group, relatives, friends, official and the same, wherein there is no sharing of official users with other social media topics as relatives and friends.

In some embodiment, the method (10) may include enabling, by the information sharing subsystem, at least one of a first user from the one or more users or a first entity from the one or more entities to create a group of the at least one of the second user or the second entity for sharing the information with a created group.

Further, the method (10) may include enabling, by the information sharing subsystem, the at least one of the first user from the one or more users or the first entity from the one or more entities to dynamically select at least one of a plurality of friends, a plurality of relatives to share the information by further enabling a plurality of security settings on the platform.

In one specific embodiment, the method (10) may include displaying, by the display subsystem, different types of advertisements and information news fed by users or Internet of Things on a country wise respective topic display bar of user, wherein the plurality of advertisements are displayed in form of audio, videos, graphics, images, scrolling text at the top or bottom and the like.

In one embodiment, displaying the plurality of advertisements may include displaying depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like.

In some embodiment, the method (10) may include connecting, by a connecting subsystem, a first database of at least one of a first level search engine or a second level search engine to a second database associated with a third search engine application programming interface to fetch information based on the application programming format.

In such embodiment, the method (10) may include transferring the received query to the first topic search engine and the existing search engine simultaneously which in further displays output in two different tabs, wherein a first tab display results in terms of nested topic levels and a second tab display results in form of links, images, videos and the like.

In one embodiment, the one or more users may see at least one of a first tab and second tab result based on the user requirement. In another embodiment, the method (10) may include displaying, by the display subsystem, fetched information on a display device based on a required application programming format.

Further, the method (10) may also include sending, by an information transmission subsystem, business leads associated with at least one nested topic level to one or more service providers related to web information document automatically based on the information owner of the information owner and lead requirement data present in the plurality of databases for national or country wise international business. Leads are generated and sent to every information owner based on user requirements.

In one embodiment, the method (10) may also include receiving, by a feedback subsystem, one or more feedbacks from the one or more users based on a last level information associated with the at least one displayed nested topic level. In such embodiment, receiving the one or more feedbacks may include receiving quality of the information, number of times the information being used, number of news feed postings done by information owner on the plurality of topics, number of likes on the postings and the like. Further, the method (10) may include storing, by the feedback subsystem, the one or more received feedbacks in at least one database of the plurality of databases to formulate the search engine optimization.

In some embodiment, the method (10) may include providing, by a shortcut creation subsystem, shortcuts to search for specific type of information from the first level search engine such as URL@URL.com for URLS, Img@ pen for images, Video@ prime minister Modi for videos and the like.

Figure 4:
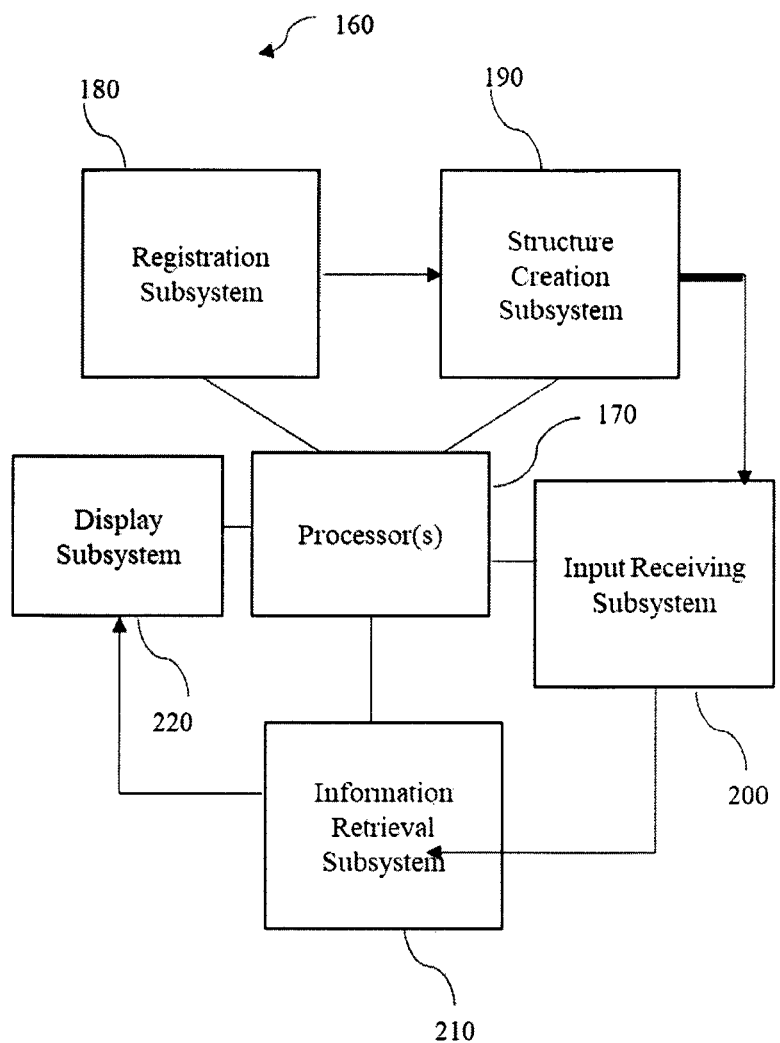
FIG. 4 is a block diagram representation of system for retrieving information through topical arrangements in accordance with an embodiment of the present disclosure.

FIG. 4 is a block diagram representation of a system (160) for retrieving information through topical arrangements in accordance with an embodiment of the present disclosure. The system includes one or more user computing devices, one or more databases, and one or more processors, memory, and other relevant hardware. Various subsystems are stored in the memory such as a structure creation subsystem, a registration subsystem, a input receiving subsystem, a movable subsystem, a feedback subsystem a data storage subsystem, an information retrieval, subsystem and display subsystem, which are executed by one or more processors for performing specific tasks. The system (160) includes one or more processors (170). In one embodiment, the system (160) may include a data storage subsystem configured to receive a plurality of details as an input associated with a plurality of nested topic levels and further store the plurality of details in a corresponding table in a database. In one embodiment, the plurality of nested topic levels includes a domain, a sub domain, a subject, a page, a category, a subcategory and a last level information.

Further, the data storage subsystem may be configured to store last level information in a different format such as uniform resource location (URL) of web applications, images, videos, addresses, experts, products, Internet of things (IoT), information owner and user personal information and the like in the database. In some embodiment, the plurality of nested topic levels is created using a plurality of components.

The system (160) includes a registration subsystem (180) operable by the one or more processors (170). The registration subsystem (180) is configured to enable one or more users to register on a platform upon receiving a plurality of user details from the one or more users to keep track of actions performed and allowing user to save information. In one embodiment, the one or more users may register through a user computing device. In one embodiment, the user computing device may be one of a mobile phone, a laptop, a tablet, a desktop and the like.

The system (160) also includes a structure creation subsystem (190) operable by the one or more processors (170). The structure creation subsystem (190) is configured to receive different types of nested topics and different types of information through a web document with one or more means. In one embodiment, the different types of nested topics are received by one of a user or by applying artificial intelligence on database.

The structure creation subsystem (190) is also configured to create different structures of the types of topics with nested levels along with components as a basic topic unit. Topics levels are displayed in terms of basic topic level unit set as category, which is collection of subcategories. Subcategories are nothing but readymade queries. In one embodiment, the different structure of the plurality of topics as per the application may include social media, shopping, Internet of Things, business page, celebrity, normal and alike, along with various components as movement components, feedback from user components, help component, modifying component, topic title component, different types of advertisements, second search bar, second search topic scope select component, audio, video, graphics components, dynamic news feed and display bar based on a user location where in topics structures of all above components can be designer ones with different shapes, borders, colours, patterns of images, videos, audios, etc. as per customer requirement.

The method (190) also includes social media type of topic, wherein topic titles may be relatives, friends, official and other as per requirement. Subcategories are nothing but groups in this case. Relatives may include groups associated with plurality of relatives, friends may include groups associated with the plurality of the friends, official may include groups associated with the officials. Subcategories or groups of relatives can be father side relatives, mother side relatives, father in laws relatives, mother in laws relatives and alike. In the same way every subcategory or group will have their user groups. In this social media topic structure, when clicked on group we see individual users under that group which are networked with each other by structure creation subsystem.

The structure creation subsystem (190) is also configured to network graphically these types of topic levels based on user requirements. The structure creation subsystem (190) is also configured to arrange topics as fixed, variable, customized and on a menu bar and a plurality of first topic search bar to retrieve information through these arrangements.

In one specific embodiment, the system (160) may include a fixed topics arrangements where at least one topic is displayed A-Z country wise and with every possible means, variable topic arrangements wherein the plurality of variable topics are represented in front of the one or more users in a cyclic manner from start to end of a database after a certain interval of time, new topic arrangements wherein the plurality of new topics are the daily submitted topics represented in front of the one or more users, first topic search bar wherein user can search topics or information in a database along with customization on fixed topic arrangement provision to add or modify these topics by the user or Internet of Things. Menu bar has fixed, variable, new, and customized topics placed arranged on it.

The system (160) also includes providing at least one topic A-Z country index wise for fixed, variable, new and customized arrangement, which means every information under any type of topic is displayed A-Z country index wise.

The system (10) also includes one of the nested levels where set of readymade queries for every topic are expected with different means. Every query has two parts. One part as fixed query text and second part for new input of text as dynamic query part. E.g. query is best movie of the year+ new input. Best movie of the year is static & new input is dynamic. Here use need not type static part again & again. This topic level can be from any topic on a system. This query structure may be used by any search engine.

The system (100) also includes an input receiving subsystem (200) operable by the one or more processors (170). The input receiving subsystem (200) is configured to receive a query from one or more users or Internet of Things, wherein the query may include at least one static or dynamically input keyword. In one embodiment, query is received via selection of gathered text from the web document where search bar is present or selection of subcategory from at least one nested topic level or gathering of text as a queries as per topic using artificial intelligence applied on a web documents or selection of any of the topic level, as a static part along with addition of dynamically input keyword if required by the one or more user or Internet of Thing in a search bar. This query structure may be used by any search engine.

In another embodiment, the menu bar may be configured to provide a plurality of variable topics, wherein the plurality of variable topics represented in front of the one or more users in a cyclic manner from start to end of a database after a certain interval of time. In such embodiment, each information associated with each of the at least one nested topic level may be fetched from a plurality of databases.

In yet another embodiment, the menu bar may be configured to provide a plurality of new topics, wherein the plurality of new topics is the daily submitted topics represented in front of the one or more users.

In one specific embodiment, the system (160) may include a customization subsystem configured to enable one or more registered users to edit, add or remove the at least one nested topic level from the menu bar upon logging on the platform. In such embodiment, the one or more users may add a plurality of nested topic levels on the menu bar. An embodiment may include customization of topics by editing or modifying categories structures and components wherein designer components structures with different shapes, borders, colours, and patterns can be made available as per customer requirement.

In one embodiment of the system, the plurality of nested topic levels added or removed by the one or more users is a representation of a plurality of customizable topics. In such embodiment, the plurality of fixed topics, the plurality of variable topics, the plurality of new topics and the plurality of customizable topics may be represented in terms of one of a text or a graph. Further, in some embodiment, the data storage subsystem may be configured to store a plurality of added nested topic levels in the plurality of databases for future use.

Further, the system (160) includes an information retrieval subsystem (210) operable by the one or more processors (170). The information retrieval subsystem (210) is operatively coupled to the input receiving subsystem (200). The information retrieval subsystem (210) is configured to create a vocabulary list and then full inverted index on these types of topics levels, wherein these types of topics level may include domain, sub domain, subject, page, category, subcategory and last level information.

In one embodiment, creating the vocabulary list may include lexical analysis, stemming, & stop word removal from topic titles, and web documents. Full inverted index may be created by adding a plurality of nested topic levels include table creation of terms and respective document, term frequency in document, & document frequency. The vocabulary list and full inverted index may be created for plurality of nested topics levels and for plurality of web documents in the database.

Further, the information retrieval subsystem (210) is configured to extract a plurality of tokens from the query by applying lexical analysis, stemming & stop word removal from the query. Further, the information retrieval subsystem (210) is also configured to match the plurality of tokens extracted from the query with these types of topics levels indices along with complete set of documents of a database.

In one embodiment, the information retrieval subsystem (210) may be configured to match the plurality of tokens extracted from the query with these types of topics levels indices along with complete set of documents of a database. Further mapping is done for matching terms of subcategory to basic unit level of topic i.e. category here. Here matching level title is mapped along with all respective hierarchical higher topic levels till predefined basic unit of topic level and are selected for further steps i.e. mapped category title along with matching subcategory title will be selected for further processing steps here.

Further, the information retrieval subsystem (210) is also configured to segregate different types of topics and information required by the one or more users or the Internet of Things, wherein any types of information segregation comprises a fixed pattern, a new pattern, a saved list, a customized pattern and an indexed pattern parts. Wherein the plurality of retrieved nested topic levels may be segregated in terms of categories, in terms of timeline bars for city, country and international postings, scroll bars of topics, pull down menus, nested A-Z, 0-9 number of indices for topics, A-Z country index with topics along with different types of advertisements.

In some embodiment, the at least one subcategory may include information associated with heads such as web uniform resource locator, address, information associated with internet of physical or virtual things, audio, video, user activity groups, products sale, experts, ppts, IPR sale, product resale, maps, images, books, question and answers, services, events, jobs, share and save. In one embodiment, user activity groups may include a groups associated with a plurality of users interested or working in the same topic domain, and groups associated with the internet of physical or virtual things or combination of both. Wherein at least one information head provides information country wise.

The information retrieval subsystem (210) is also configured to rank sequence for a plurality of retrieved topics or last level information type as per search engine optimization formulated with various feedbacks such as count, dislike count, numbers of postings made on our own or other social media from the one or more users.

The system (160) also includes a display subsystem (220) operable by one or more processors (170). The display subsystem (220) is operatively coupled to the information retrieval subsystem (210). The display subsystem (220) is configured to display according to the segregation of various topics in terms of category or any other topic level set as a basic unit and, providing information separately for the first topic search along with advertisements on a platform.

In one specific embodiment, the system (160) may include, second search bar on every category, to search web documents or last level information for an input query to get more accurate information where scope of selected topics to search can be changed; wherein variable topic scope allows to search under respective category as a default scope, or nested all categories, or any non nested topic category along with selected ones for searching. Wherein as per segregation of information and display system only information is displayed.

In some embodiment, the system (160) may include a movable subsystem configured to provide movement actions to the one or more users to move from a first nested topic level to a second nested topic level by a use of level movement buttons as level 1, level 2, . . . level n, next button and previous buttons to move on a same level, shared buttons, star button and the like. In such embodiment, the one or more users may display nested topic levels by the use of star button action.

In some embodiment, the display subsystem (220) may be configured to enable the one or more users and one or more entities associated with the internet of things (IoT) to provide news feed associated with the at least one retrieved nested topic level in the plurality of databases. In such embodiment, the one or more entities associated with the internet of things (IoT) may include physical or virtual things in IoT.

The display subsystem (220) may include a plurality of display bars per country. The display subsystem (220) may be configured to display a plurality of news feed associated with the at least one retrieved nested topic level on the plurality of corresponding display bars from respective country for international information only. In one specific embodiment, the system (160) may include an information sharing subsystem configured to create dynamic linkage between the one or more users, one or more entities associated with Internet of Things and a combination thereof for sharing the information associated with the at least one nested topic levels of topic in user activity group, relatives, friends, official and the same, wherein there is no sharing of official users with other social media topics as relatives and friends.

In one embodiment, the information sharing subsystem configured to enable at least one of a first user from the one or more users or a first entity from the one or more entities to create a group of the at least one of the second user or the second entity for sharing the information with a created group. In some embodiment, the at least one of the first user from the one or more users or the first entity from the one or more entities may dynamically select at least one of a plurality of friends, a plurality of relatives, a plurality of topic wise users to share the information by enabling a plurality of security settings on the platform.

In one specific embodiment, the display subsystem (220) may also be configured to display different types of advertisements and information news fed by users or Internet of Things on a single display bar of user, wherein the plurality of advertisements are displayed in form of audio, videos, graphics, images, scrolling text at the top or bottom and the like.

In some embodiment, advertisement may include, but not limited to, a depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like.

Further, in some embodiment, the format of advertisement may include, but not limited to, singular or in combination, an audio or animation or other multimedia element played at various times, banner advertising, network links, electronic-mail, images, text messages, video clips, audio clips, programs, applets, cookies, scripts, and the like.

In one embodiment, the system (160) may include a connecting subsystem configured to connect a first database of at least one of a first level search engine or a second level search engine to a second database associated with a third search engine application programming interface to fetch information based on the application programming format. In such embodiment, the received query may be transferred to the first topic search engine and the existing search engine simultaneously which in further displays output in two different tabs. In one embodiment, a first tab display results in terms of nested topic levels and a second tab display results in form of links, images, videos and the like.

The one or more users may see at least one of a first tab and second tab result based on the user requirement. In another embodiment, the display subsystem (220) may be configured to display fetched information on a display device based on a required application programming format.

In some embodiment, the system (160) may include an information transmission subsystem configured to send business leads associated with at least one nested topic level to one or more service providers automatically based on the personal data of the information owner and lead requirement data present in the plurality of databases for national or country wise international business. Leads are generated and sent to every information owner based on user requirements.

In some embodiment, the system (160) may include a feedback subsystem configured to receive one or more feedbacks from the one or more users based on the at least one displayed nested topic level. In such embodiment, the feedback may include quality of the information, number of times the information being used, number of news feed postings done by information owner on the plurality of topics, number of likes on the postings and the like. Further, the feedback subsystem may be configured to store the one or more received feedbacks in at least one database of a plurality of databases to formulate the search engine optimization.

In some embodiment, the system (160) may include a shortcut creation subsystem configured to provide shortcuts to search for specific type of information from the first level search engine such as URL@URL.com for URLS, Img@ pen for images, Video@ prime minister Modi for videos and the like.

Figure 5:
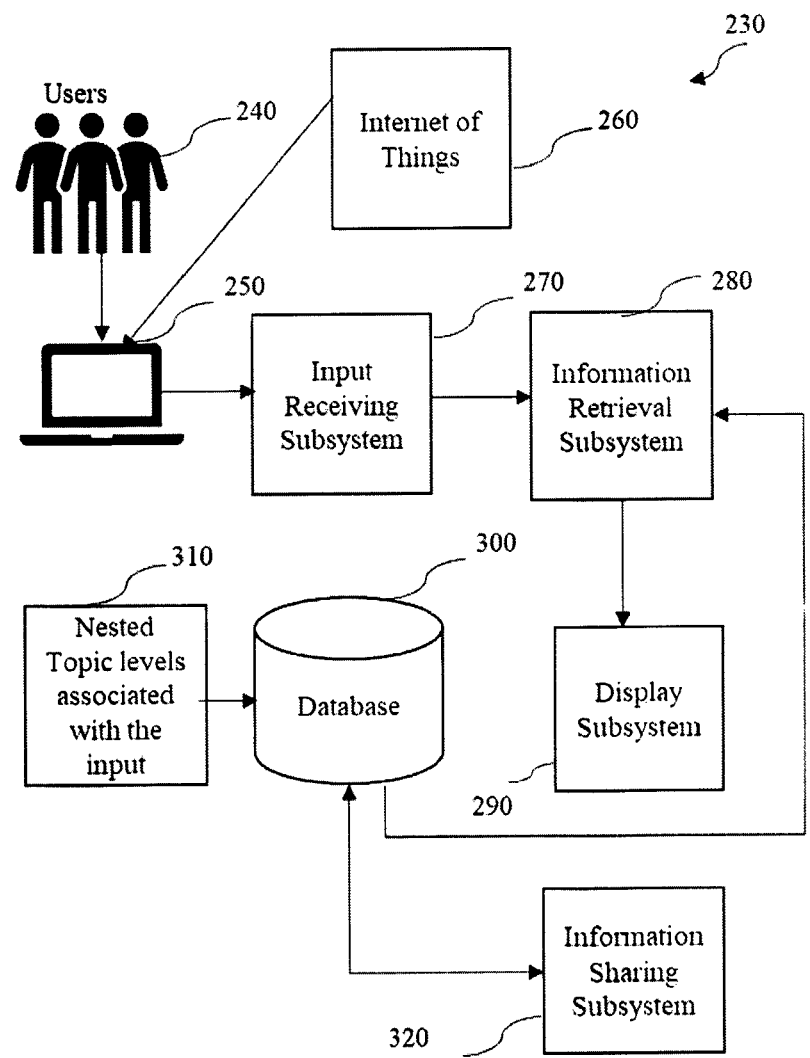
FIG. 5 is a block diagram of an embodiment of the system for retrieving information through topical arrangements of FIG. 2 in accordance with an embodiment of the present disclosure.

FIG. 5 is a block diagram of an embodiment of the system (230) for retrieving information through first topic arrangements of FIG. 4 in accordance with an embodiment of the present disclosure. A user (240) inputs a keyword such as chat by an input receiving subsystem (270), on a search bar by a laptop (250). Also, the input receiving subsystem (270) receives input from an internet of things (260).

Upon receiving the keyword such as chat on the platform, the system (230) searches information associated with the keyword chat by the information retrieval subsystem (280) from a database (300), wherein the database (300) includes a plurality of already created nested topics levels associate with the input (310). Further, the system (230) fetches a plurality of categories such as communication, chat places, restaurants associated with the keyword chat from the database (300). Further, the plurality of subcategories is also displayed, by a display subsystem (290), corresponding to each of the plurality of categories.

Upon displaying the plurality of categories and the plurality of corresponding subcategories by the display subsystem (290) on the platform, the user (240) clicks on at least one of the subcategory to get the required information associated with the keyword, wherein the required information includes videos, links, images and the like of the required topic. Also, the user (240) shares the information associated with a particular topic, by an information sharing subsystem (320), with other user by logging on the platform.

Furthermore, the input receiving subsystem (270), the information retrieval subsystem (280) and the display subsystem (290) are substantially similar to an input receiving subsystem (200), an information retrieval subsystem (210) and a display subsystem (220) of FIG. 4.

Figure 6:
FIG. 6 is an exemplary embodiment of the system for retrieving information through topical arrangements of FIG. 3 in accordance with an embodiment of the present disclosure.

FIG. 6 is an exemplary embodiment of the system (330) for the first topic search engine of FIG. 5 in accordance with an embodiment of the present disclosure. A user inputs a word "chat" on a search bar. While entering the word as the "chat" by the user on the search bar, the search bar will start fetching the keywords associated with the chat such as chatnies/salads and chat places from a database. Further, the search engine checks for a plurality of nested topic levels related to the word chat, where the search engine shows four nested topic levels such as chatnies/salads, chat, communication and food places. Further, the search engine will display the last level information associated with a "Bhel" on the display bar upon selecting the "Bhel" from the nested topic level "Chat".

Figure 7:
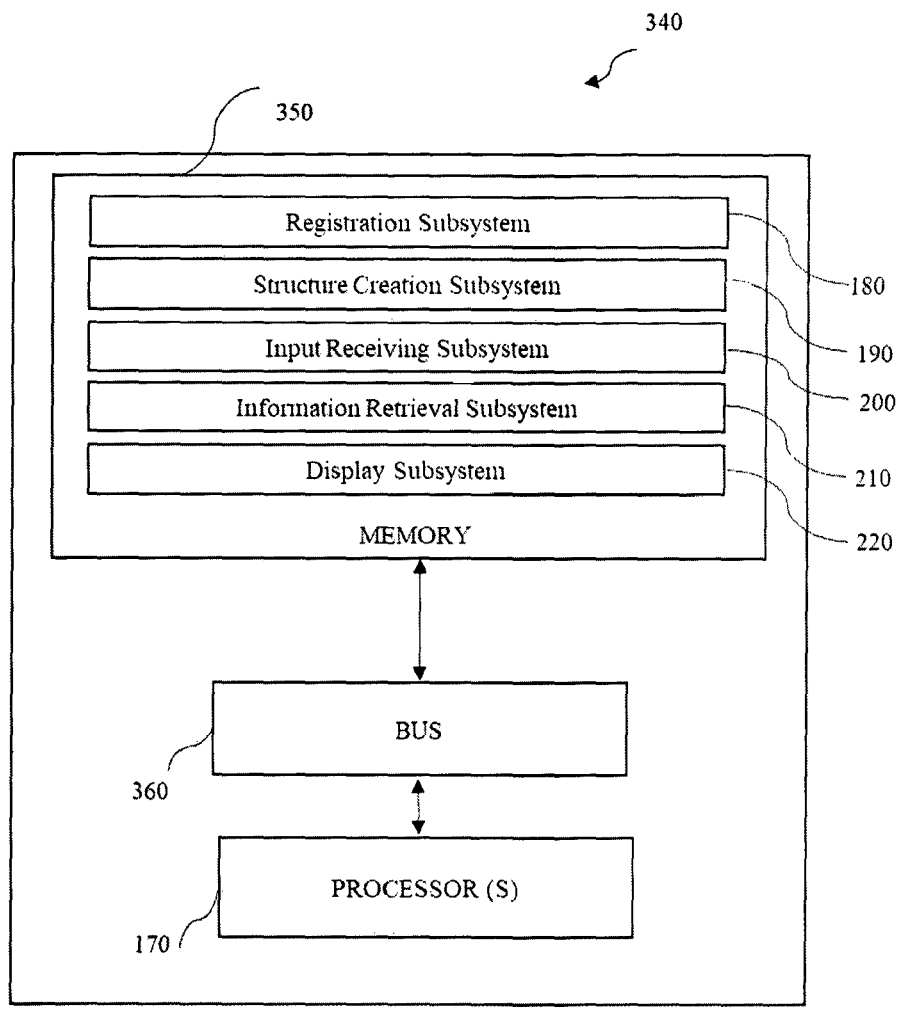
FIG. 7 is a block diagram of a general computer system in accordance with an embodiment of the present disclosure.

FIG. 7 is a block diagram of a general computer system (340) in accordance with an embodiment of the present disclosure. The computer system (340) includes processor(s) (170), and memory (350) coupled to the processor(s) (170) via a bus (360).

The processor(s) (170), as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory (350) includes a plurality of units stored in the form of executable program which instructs the processor (170) to perform the configuration of the system illustrated in FIG. 2. The memory (350) has following subsystems: a registration subsystem (180), a structure creation subsystem (190), an input receiving subsystem (200), an information retrieval subsystem (210) and a display subsystem (220) of FIG. 2.

Computer memory elements may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on any of the above-mentioned storage media may be executable by the processor(s) (170).

The registration subsystem (180) instructs the processor(s) (170) to register one or more users on a platform upon receiving a plurality of user details from the one or more users to keep track of actions performed and allowing user to save information.

The structure creation subsystem (190) instructs the processor(s) (170) to receive different types of nested topics and different types of information through a web document with one or more means.

The structure creation subsystem (190) instructs the processor(s) (170) to create different structures of the types of topics with nested levels along with components as a basic topic unit.

The structure creation subsystem (190) instructs the processor(s) (170) to network graphically these types of topic levels based on the user requirements.

The structure creation subsystem (190) instructs the processor(s) (170) to arrange topics as fixed, variable, customized and first topic search bar to retrieve information through these arrangements.

The input receiving subsystem (200) instructs the processor(s) (170) to receive a query from one or more users or Internet of Things, wherein the query comprises at least one static or dynamically input keyword.

The information retrieval subsystem (210) instructs the processor(s) (170) to create an inverted index on these types of topics levels, wherein these types of topics level comprises domain, sub domain, subject, page, category, subcategory and last level information.

The information retrieval subsystem (210) instructs the processor(s) (170) to extract a plurality of tokens from the query.

The information retrieval subsystem (210) instructs the processor(s) (170) to match the plurality of tokens extracted from the query with these types of topics levels indices along with complete set of documents of a database.

The information retrieval subsystem (210) instructs the processor(s) (170) to map a plurality of matched topic levels to a higher-level topics set as the basic unit of nested topic level such as a category for topic search.

The information retrieval subsystem (210) instructs the processor(s) (170) to retrieve these types of topics levels and information associated with the query from a plurality of databases based on a matched topic levels and information for first topic search bar.

The information retrieval subsystem (210) instructs the processor(s) (170) to segregate different types of topics and information required by the one or more users or the Internet of Things, wherein any types of information representation arrangement format for display comprises a fixed pattern, a new pattern, a saved list, a customized pattern and an indexed pattern parts.

The information retrieval subsystem (210) instructs the processor(s) (170) to rank a sequence for a plurality of retrieved topics or last level information type as per search engine optimization formulated with various feedback such as count, dislike count, numbers of postings made on our own or other social media from the one or more users.

The display subsystem (220) instructs the processor(s) (170) to display according to the segregation of various topics in terms of category or any other topic level set as a basic unit and, providing information separately for the first topic search along with advertisements on a platform.

The concept of the smart Thing in IoT is that, it communicates information of interest, records, and processes it potentially at any time, any place, and to anyone, when needed. The information is made available by a single node or a number of nodes in a group. When the information is available through some physical Thing or object, we call it a physical Thing. A Thing senses, records, processes, communicates, moves, and maintains it's own privacy and security. It has the decision making capability, self awareness, and limited intelligence. It takes care of its own life with power monitoring, saving, wastage, and the availability of power. Things create, manage, and destroy other Things. When edge technology has the intelligence to add many smart automatic reconfigurable properties mentioned above for Things, it is a smart Thing. When same actions are carried by developing logic they are known as virtual Things.

Various embodiments of the present disclosure provide a technical solution to the problem of accessing information in a fast and an easy manner. The present search engine provides an efficient system to provide more than one outputs with single search in terms of topics. Also, the present search engine eliminates black box problem by displaying hidden information in front of the user, thereby saving the time of the user which the user spends on searching daily required information. Further, the present search engine provides fixed menu bars which displays topics in terms of categories and provides second search engine to search information on the displayed topic.

Moreover, the present search engine requires less human intervention since the system automatically brings the hidden topics or newly submitted topics in front of the user in a cyclic manner from start to end after a certain or predetermined interval of time, such as after every one day or one month. Furthermore, the present search engine provides search results in terms of various nested topics which is 10-100 times more than existing search engine results. Also, the present search engine creates graphs of topics instead of providing query linking in a chain pattern to see the next required result.

Further, the search engine provides movement actions for the user to shift from one topic to another. Furthermore, the search engine reduces the typing work of the user by enabling the user to just click on the readymade queries for fetching the information from the database. Moreover, the present engine searches and provides searched topic in different structural format based on the information. The engine also enables a first user to feed news associated with a particular topic on the news feed bar and also enables a second user to see the news based on selected topic. The topics can also add by the user dynamically based on type of category structure.

Further, the invented search engine displays the last level information, which is the required information in terms of new, fixed ads, indexed information, maps (IoT), category structures, single or multiple alphabetical indexes which are nested one inside another and the like. Also, the second search engine provides the result by searching on small number of information for a specific selected topic, thereby reducing backend processing power which in turn reducing carbon footprints. Furthermore, the search engine enables the user or 'thing' of internet of things to share information with the friends, relatives by creating the relationship with each other.

The present search engine also receives feedbacks from the users for formulating the search engine optimization of topics. Moreover, the present search engine displays information in terms of nested levels with scroll bars, menu bars and the like. Also, the search engine provides further services or subcategories associated with the topic as sell and resell of products, books, topic wise jobs, news, events, blogs, timeline bars, topic choice selection, slide presentations, providing quick information associated with the topic and the like as a complete category structure. Furthermore, the customized category structure involves decorative borders and means to display an image or video along with one or more subcategories.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A method for retrieving information by a search engine from one or more databases through topical searching and arrangements, the method comprising:
   registering, one or more users via a user computing device on a platform on receiving a plurality of user details from the one or more users to track actions performed, and allow saving of information by one or more users;
   receiving, different types of topics, and different types of information through web documents or through one or more databases along with information ownership and generating and sending lead requirement details globally to at least one user or information owner for at least one topic;

creating, different structures of the topics with hierarchical levels along with various customizable components based on user requirements;

creating a graphical network of the topic levels based on predefined requirements;

arranging, the topics as fixed, new, variable or customized on a menu bar, for a topic search bar to retrieve information;

receiving, a query at the topic search bar from one or more users or Internet of Things, wherein the query comprises at least one static or dynamic input keyword;

creating, a vocabulary list and generating an inverted index based on the topic levels and the associated information;

extracting, plurality of tokens from the received query using lexical analysis, stemming, and stop word removal techniques;

matching, the plurality of tokens extracted from the received query with the inverted index of topic levels and associated information;

retrieving, the topics and information associated from one or more databases based on the matched topic levels;

segregating, the retrieved topics and associated information into distinct types required by one or more users or the Internet of Things, wherein said distinct types of information are arranged in a hierarchical structure starting from basic topic unit for displaying in ordered or non-ordered list formats;

ranking the retrieved topics or the associated information based on search engine optimization criteria, using feedback such as count, dislike count, numbers of postings and other social media activity; and displaying the retrieved or topic level in terms of basic topic unit and associated information separately for the topic search along with advertisements on the platform.

2. The method as claimed in claim 1, wherein receiving the different types of topics include receiving either from a user or from web documents, or from collecting search results, or by applying artificial intelligence on a database for forming a basic topic unit.

3. The method as claimed in claim 1, wherein creating different structures of the topics with hierarchical levels along with various customizable components include movement components, feedback from user components, help component, modifying component, topic title component, different types of advertisements, complete topic as advertisement, and a second search bar wherein the second search bar further provides search results within the scope of the created structure of the components including like, dislike, help, audio, video, graphics components, dynamic news feed and display bar based on user location wherein the topic structures are customizable with different shapes, borders, colours, patterns of images, videos, and audio based on predefined requirements.

4. The method as claimed in claim 1, comprising creating a graphical network of the topic levels include connecting and sharing the created different structures of the topics with hierarchical levels.

5. The method as claimed in claim 1, wherein arranging the topic as fixed, new, variable or customized on a menu bar, for a topic search bar to retrieve information includes displaying at least one of the topics in ordered or non-ordered list formats, a plurality of variable topic arrangement displayed in a cyclic manner across the database after a predetermined interval of time, a new topic arrangement of the daily submitted topics.

6. The method as claimed in claim 1, wherein receiving at least one query comprises selection of gathered text from a web document, search results based on user query, selecting subcategories from at least one topic level, gathering of text as a query as per topic using artificial intelligence applied on a web document, or selection of the topic level as a static part along with addition of a dynamic-input keyword by the one or more users or Internet of things.

7. The method as claimed in claim 1, wherein, displaying the segregated topic level comprises dynamic linkage between one or more users, one or more entities associated with the Internet of Things or a combination thereof, for sharing information associated with the at least one topic level in a user activity group, relatives and friends, wherein information of official users is not shared with other social media groups involving relatives and friends.

8. The method as claimed in claim 1, wherein displaying the segregated topic level includes display of the segregated topic level along with different types of advertisements or information news provided by users or Internet of Things on respective topic.

9. The method as claimed in claim 1, wherein the retrieved topic level is further connected either to at least one of a database or a third party search engine application programming interface format or API format, for fetching, retrieving, and getting the information based on the application programming interface or API format.

10. The method as claimed in claim 3, wherein segregating of retrieved information from the second search result further comprises a process of tokenization of the query provided to the second search bar defining a scope of the search to limit the number of documents, matching and retrieving from selected scope of documents and segregating the retrieved documents under a single topic category, documents under the higher topic level of the same topic, or documents under non related different topic.

11. The method as claimed in claim 1, wherein creating different structures of the topics with hierarchical levels further includes creating search shortcuts to directly retrieve specific information, wherein the search shortcut uses at least one of an URL search shortcut format as "URL@URL", a person search shortcut uses format as "PER @personname", and an event search shortcut uses format as "event@event name".

12. The method as claimed in claim 1, wherein segregating in ordered list format comprises single or multiple nested A-Z indices along with any type of advertisement or separate A-Z country index along with any type of advertisement per country or separate 0-9 index and non-ordered lists comprises scroll bars and combined posting bar based on predefined requirements.

13. A system for retrieving information by a search engine from one or more databases through topical searching and arrangements, the system comprising:
one or more processors configured to register one or more users on a platform via a user computing device on receiving a plurality of user details from one or more users to track actions performed and allow said one or more users to save information;
receive different types of nested topics and different types of information from a web documents or from one or more databases along with information ownership and generating and sending lead requirement details globally to at least one user, or information owner for at least one topic;

create different structures of the topics with nested hierarchical levels along with customizable components based on user requirements;

create a graphical network of said topic levels based on predefined requirement;

arrange the topics into fixed, new, variable, or customized on a menu bar for a topic search bar to retrieve information;

receive a query on the topic search bar from one or more users or Internet of Things, wherein the query comprises at least one static or dynamic-input keyword;

create an inverted index of the topic levels and the associated information;

extract plurality of tokens from the received query using lexical analysis, stemming, and stop word removal techniques;

match the plurality of tokens extracted from the received query with the inverted index of topic levels and associated information;

retrieve the topics and the information associated from one or more databases or application programming interface (API) based on the matched topic levels;

segregate the retrieved topics and the associated information into distinct types required by one or more users or the Internet of Things, wherein said distinct types of information are arranged in a hierarchical structure starting from basic topic unit to display in ordered or non-ordered list formats;

rank the retrieved topics based on search engine optimization criteria, using feedback such as user count, dislike count, number of postings and other social media activity; and display the retrieved topic level in terms of a basic topic unit and associated information separately for topic search along with advertisements on the platform.

14. The system as claimed in claim 13, wherein the different types of topics are received either from a user, from web documents, from collecting search results, or by applying artificial intelligence on a database for forming a basic topic unit.

15. The system as claimed in claim 13, wherein creating different structures of the topics with hierarchical levels along with various customizable components includes title component, different types of advertisements, complete topic as advertisement, and a second search bar wherein the second search bar further provides search results within the scope selected from created structure of the components, including like, dislike, help, audio, video, graphics components, dynamic news feed and display bar based on user location, wherein the topic structures are customizable with different shapes, borders, colours, patterns, images, videos, and audios based on predefined requirements.

16. The system as claimed in claim 13, wherein the created graphical network of said topics are connected and shared with the created different structures of the topics.

17. The system as claimed in claim 13, wherein arranging the topic as fixed, new, variable or customized on a menu bar, for a topic search bar to retrieve information includes displaying at least one of the topics in ordered or non-ordered list formats, variable topic arrangements displayed in a cyclic manner across the database after a predetermined interval of time, new topic arrangement of the daily submitted topics.

18. The system as claimed in claim 13, wherein the query is received via selection of gathered text from a web document, search results based on user query, selecting subcategories from at least one topic level, or gathering of text as a query as per topic using artificial intelligence applied on a web document or a static part along with addition of a dynamic-input keyword by the one or more users or Internet of Thing.

19. The system as claimed in claim 13, wherein display the segregated topic level comprises dynamic linkage between one or more users, one or more entities associated with the Internet of Thing, or a combination thereof for sharing information associated with at least one topic level in a user activity group, relatives and friends, wherein the information of official users is not shared with other social media groups involving relatives and friends.

20. The system as claimed in claim 13, wherein the segregated topic level is further displayed along with different types of advertisements or information news provided by users or Internet of Things on a respective topic.

21. The system as claimed in claim 13, wherein display of retrieved topic level includes connection to at least one of a database or a third search engine application programming interface API format for fetching and displaying information based on the application programming format.

22. The system as claimed in claim 13, wherein segregating of retrieved information from the second search result comprises the process of tokenization of the query provided to the second search bar defining a scope to limit the number of documents, matching and retrieving from selected scope of documents and segregating the retrieved documents under a single category topic, documents under the higher topic level of the same topic, or documents under non related different topic.

23. The system as claimed in claim 13, wherein the different structures of the topics are created with shortcuts to specific types of information, such as URL based search as "URL@URL domain name", person based search as "PER@personname", and event based search as "event@event name".

24. The system as claimed in claim 13, wherein the segregation in ordered list format comprises single or multiple nested A-Z indices along with any type of advertisement or separate A-Z country index along with any type of advertisement per country or separate 0-9 index and non-ordered lists comprises scroll bars and combined posting bar based on predefined requirements.

* * * * *